May 11, 1937.  E. V. J. TOWER  2,079,753
AUTOMATIC CLUTCH
Filed Dec. 20, 1934  3 Sheets-Sheet 2
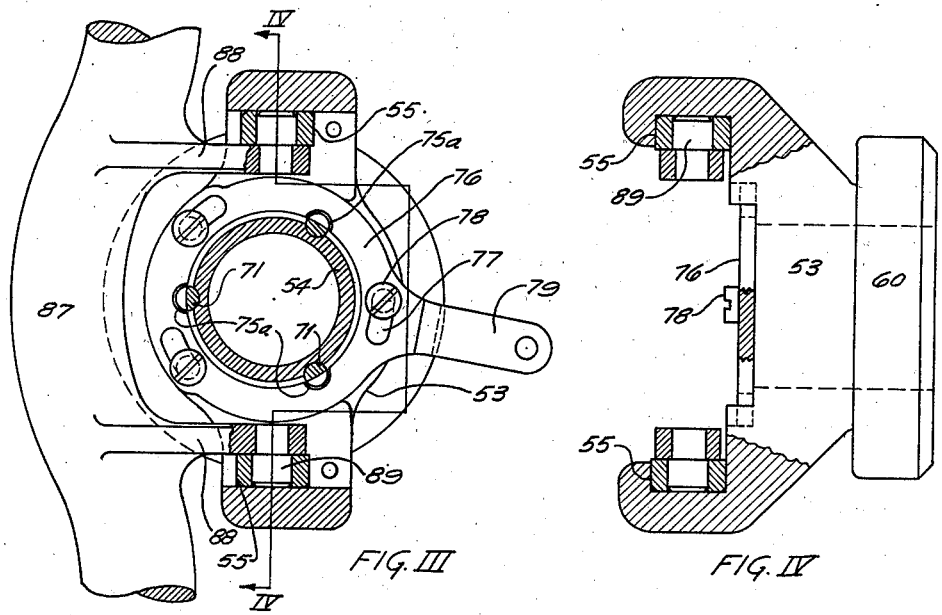
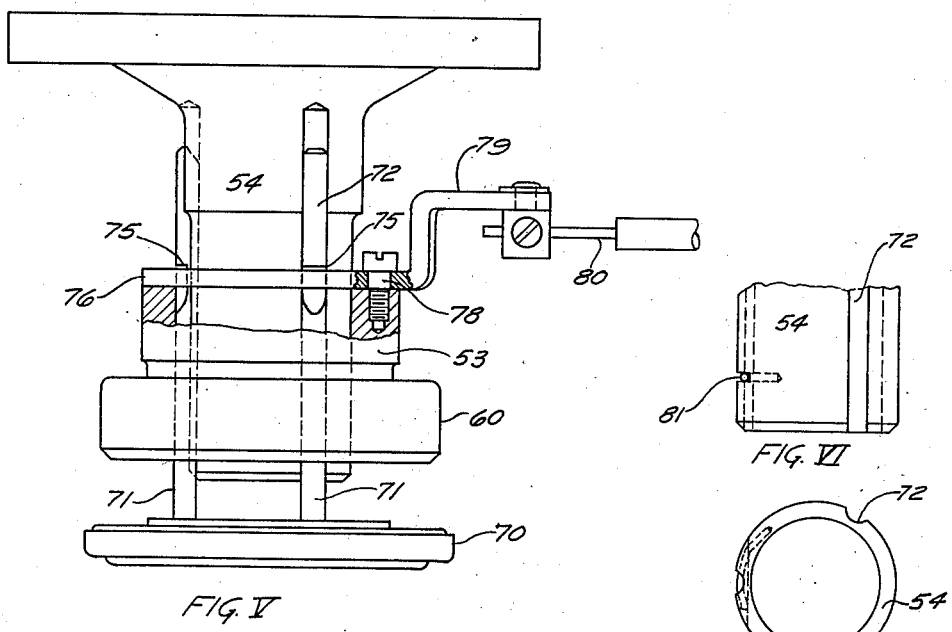
ELMER V. J. TOWER,
INVENTOR.
BY
Carroll R. Taber
ATTORNEY.

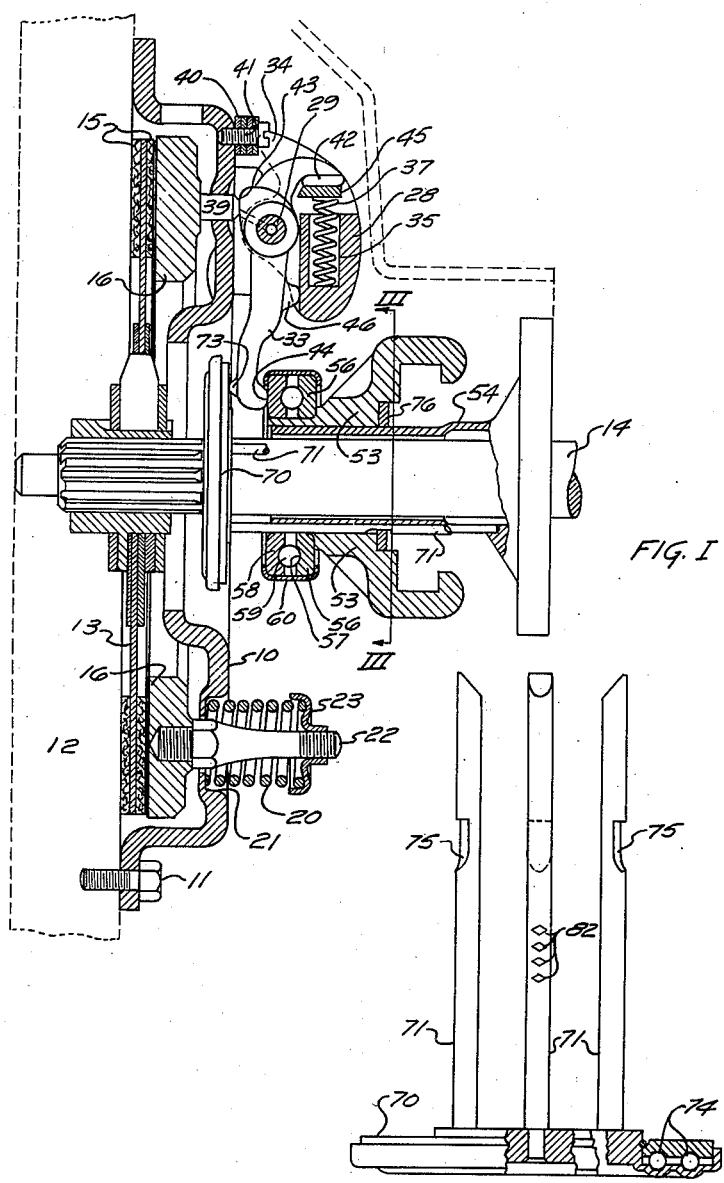

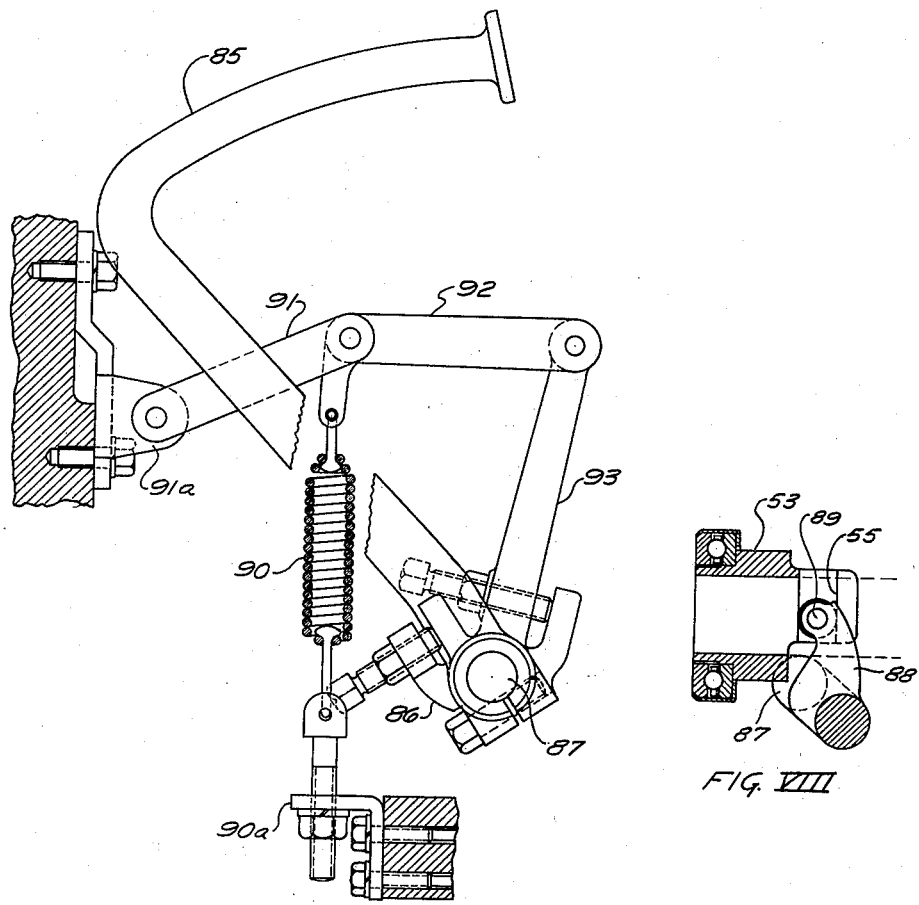

Patented May 11, 1937

2,079,753

UNITED STATES PATENT OFFICE 2,079,753

AUTOMATIC CLUTCH

Elmer V. J. Tower, Lansing, Mich., assignor to Motor Wheel Corporation, Lansing, Mich., a corporation of Michigan Application December 20, 1934, Serial No. 758,465

13 Claims. (Cl. 192—105)

This invention relates to converters for automobile clutches, that is, to mechanism which functions to convert an automatic clutch into a conventional type of clutch.

Automatic clutches are well known in the art, comprising devices, usually in the nature of centrifugally operated weights, which at a certain speed of the clutch will cause the normally disengaged clutch members to be engaged. Such automatic clutches are particularly designed for use in automobiles or other vehicles using internal combustion engines as a driving means. Usually a clutch-pedal is provided whereby the depressing of the pedal will disengage the clutch members even though they have been engaged by the automatic means,—thus enabling the usual gear-shifting operation to be made.

The converter mechanism referred to is intended to provide for certain conditions wherein it is desirable to convert the clutch into the conventional type with the driving and driven members positively engaged instead of disengaged. Such a condition is necessary when the engine is at rest and it is desired to spin the motor over by pushing or towing the car with the transmission gears in mesh; or in cases where it is desired to park the car with the gears in mesh as a further braking means for safety reasons.

In the present improvements, this conversion is accomplished through the operation of the ordinary clutch pedal and new associated devices. The pedal has its usual retracting spring for restoring the pedal to normal or rest position. When the pedal is depressed (as in the ordinary clutch-disengaging operation) the retracting spring may be connected through the converter mechanism with the clutch levers. Upon release of the foot pedal the retracting spring pulls the clutch members progressively into engagement against the tension of their disengaging springs.

With these and incidental objects in view, the improvements are embodied in the mechanism shown in the accompanying drawings.

The automatic clutch above referred to is herein shown and described as of the type forming the subject matter of my co-pending application Serial No. 710,295 filed February 8, 1934.

In the drawings:

Figure I is a sectional view of an automatic clutch assembly with converter mechanism by means of which the clutch may be operated in a conventional manner;

Figure II is an enlarged view of the converter bearing plate with parts broken away to show the interior thereof;

Figure III is a sectional view of the release roller taken on substantially the line III—III of Figure I and showing the position of the release fork with respect to the release collar;

Figure IV is a sectional view of the release collar taken on substantially the line IV—IV of Figure III;

Figure V is an enlarged side view partly in section of the converter mechanism and release collar of Figure I;

Figure VI is a partial side view of the sleeve housing shown in Figure V upon which the release collar is mounted;

Figure VII is an end view of the structure shown in Figure VI;

Figure VIII is a partial sectional view on a reduced scale showing the relation of the release fork shaft and release fork to the release collar illustrated in Figure III; and Figure IX is a more or less diagrammatic illustration of the clutch pedal assembly associated with the release fork shaft 87.

Automatic clutch

The automatic clutch mechanism, which is also described in the copending application above referred to, is constructed as follows:—

A mounting cover 10 is secured by cap screws 11 to a major driving member 12 which is here shown as the fly wheel of a motor vehicle. The driving member 12 is rotated in the usual manner during the operation of the motor vehicle. Between the cover 10 and the fly wheel 12 is positioned a driven member 13 splined to one end of the transmission jack shaft 14. The other end of the jack shaft is connected to and part of a conventional transmission not here shown. The driven member 13 may be of any conventional form and is provided with the usual friction mats 15 adjacent its periphery, and a vibration dampener assembly when required.

A pressure plate 16 which may be formed of cast metal is positioned concentrically between the driven member 13 and the cover 10. It is connected to the mounting cover and rotates therewith. The connection between the pressure plate 16 and the cover 10 is such that the pressure plate is slidable laterally with respect thereto and is normally disengaged when the clutch is at rest or is rotated at speeds below a partial engagement point. This connection comprises driving lugs (not shown) carried by the pressure plate 16 which extend through rectangular openings formed in the top surface of the cover 10, and normal disengagement is effected by means of compression springs 20 positioned on the outside of the cover 10.

The cover 10 is provided with a plurality of circular depressions 21, each having a central opening therethrough. A release and tension and adjusting stud 22 is attached to the pressure plate 16 by screw-threaded connection therewith and extends through the central openings in each of the depressions 21. An adjusting cap 23 is secured to the outer threaded extremity of each of the studs 22. The springs 20 are compressed between the bottom of the depressions 21 and the adjusting caps 23 to maintain the pressure plate 16 out of engagement with the friction surface 15 of the driven member 13, whenever the driving member 12 is at rest or is rotating at normal motor idling speeds.

The mechanism thus far described includes a driving member in the form of a fly wheel 12, a driven member 13 having a peripheral friction surface 15, and a pressure plate 16 loosely connected to a mounting cover 10 which rotates with the fly wheel 12. The driven member 13 when at rest normally floats between the fly wheel 12 and the pressure plate 16 and out of engagement with both of these members. This is made possible by reason of the compression springs 20 which normally hold the pressure plate 16 away from the friction surface 15 of the driven member 13. Thus at normal idling speeds, the slow rotary movement of the fly wheel 12, the cover 10 and the pressure plate 16 slidably associated therewith, is not transmitted to the driven member 13. However, when the pressure plate is actuated, as will be described hereinafter, to press against the friction surface 15 of the driven member 13 that member is progressively and securely compressed between the pressure plate 16 and the fly wheel 12 and rotates with these members until idling speeds again obtain unless declutched for the free wheeling function. The rotary movement of the friction member is thus transmitted through the shaft 14 to the conventional transmission and drive shaft assemblies, and finally to the driving wheels of the vehicle.

The centrifugal weight mechanism for automatically engaging the clutch members is as follows:

The weights 28 (Fig. I) are mounted to oscillate upon tubular pins 29, and to actuate (through the interposed springs 37) levers 33. There are a plurality of these weights located concentrically around the cover 10 of the clutch unit in the usual manner.

When the cover 10 is rotated by reason of its connection with the flywheel 12 the weights 28 swing radially outwardly about the pins 29 causing the cam surfaces 43 on the levers 33 to press the thrust pins 39 against the pressure plate 16. The friction surface 15 of the driven member 13 is thereby brought into engagement progressively with both the flywheel 12 and the pressure plate 16.

These parts are described more in detail in the said copending application.

In order to limit the outward movement of the weights 28 these weights are provided with arms 34 at their radial outermost extremity; and these arms come to a stop position against adjustable non-metallic stops consisting of a plurality of strips 40 secured to the cover 10. These strips are held in position by means of a screw 41 extending through the strips and threaded into the cover 10. A sufficient number of strips 40 are used to limit the pivotal movement of the weights 28 to the desired extent.

Within the weights 28 are recesses 35 adapted to receive compression springs 37. Each lever 33 is provided with a pressure pad 42 at its extremity adjacent the springs 37, and at the inner end the levers are formed with a pressure pad 44, adapted for use in manually controlling clutch operation independently of the weights as later described. Between the pad 42 and the springs 37 is a release bar 45 which is held in contact with the pad 42 at all times by means of the preloaded springs 37.

When the weights 28 swing outwardly under centrifugal action due to the rotation of the clutch members, the weights act through the springs 37 and release bar 45 and pad 42 to oscillate the levers and cause the cam surfaces 43 thereof to press the pressure pins 39 against the pressure plate 16 to engage the clutch as already referred to.

The springs 37 are preloaded into place under initial compression, so that the release bars 45 are pressed against the lever pads 42 at all times. The preloaded action of the springs 37 serves to hold the intermediate pressure pad 46 (midway down the long arm of the lever 33) against the weight 28. After the weights have moved outwardly sufficient to engage the clutch by the above described operation, a further movement of the weights 28 takes place under increased rotating speeds, thus permitting the weights to move an additional predetermined distance until the stop arms 34 reach the stops 40. This effects a slight separation between the weight 28 and the pad 46 on lever 33, thereby slightly increasing the compression of the springs 37, and also increasing the lateral pressure of the pins 39 against the pressure plate 16. This increased lateral pressure serves to prevent slippage during suddenly increased torque loads imposed upon the clutch, such as starting in intermediate or high gear.

Clutch pedal disengagement

Such being the operation of the automatic devices for effecting clutch engagement from variable speeds of rotation of the clutch, there is provided in addition the usual pedal control for disengaging the clutch members (that is, the driving and the driven members) for all operating purposes, such as shifting gears, stopping and starting, etc., regardless of the rotating speed of the clutch.

A release collar 53 (Fig. I) is slidably mounted upon a cylindrical sleeve housing 54 enclosing the shaft 14. The collar 53 is provided with two bearings 55 (see Figs. III and IV) which are engaged by a release fork connected with the clutch pedal as presently to be described. At the inner end of the collar 53 is attached one race of a ball bearing 56 having an annular groove 57. A detachable race portion 58, similar to 56, and also having an annular groove, provides the other race for the balls 59. These parts of the bearing are held in position by cage 60. The outer surface of the portion 58 engages the above mentioned pads 44 on the release levers 33.

When the clutch pedal is depressed as later to be described, and its release fork presses to the left in Fig. I, this bears against two of the opposed contact surfaces 55 of the release collar 53 which action slides the collar along the housing 54 thus pressing the member 58 against the lever pads 44. This pressure oscillates the levers 33 about their pins 29, thus moving the cam surfaces 43 to the right in Fig. I and releasing the pressure of the pins 39 against the pressure plate 16. This permits the springs 20 to retract the pressure plate 16, thus disengaging the clutch.

In this pedal action just referred to, the oscillation of the levers 33 as just described, results in further compressing the springs 37; and when the weights 28 have moved outwardly sufficiently to bring the arms 34 against their stops, the release pedal pressure for declutching never has a greater force to overcome than to compress the springs 37 from this position. In this manner it is possible to effect easy declutching without overcoming the forces resulting from the energization of the weights 28 which of course become progressively greater at high motor speeds.

*Converter mechanism*

The operation of the converter mechanism for converting the automatic clutch into a conventional type of clutch will now be described.

Surrounding the shaft 14 and slidable laterally thereon, is a converter skeleton sleeve and bearing ring plate assembly 70 which has projecting laterally from it three equi-spaced parallel studs 71 (see Figs. I and II). These studs rest or slide in registering semi-circular grooves 72 (see Figs. VI and VII) formed part in the sleeve housing 54 and part in the release collar 53, as also shown in Figs. III and V.

The converter bearing ring plate 70 at its bearing surface is caused to bear upon auxiliary lever pads 73 extending from the lower ends of the levers 33. The bearing plate 70 is made up of two rings separated by a series of ball bearings 74 as indicated in Fig. II so as to provide non-frictional contact when brought into engagement with the auxiliary lever pads 73. The movement of the bearing plate 70 (to the left in Fig. I) is limited by a spring stop projection 81 carried by the housing 54 (Fig. VI) by reason of the engagement thereof with notches 82 formed in one of the studs 71. Thus, upon depressing the clutch pedal, registration of the stud notches 75 and interlocker latch ring 76 (referred to below) is assured.

These notches 75 are formed in the studs 71 (see Figs. II and V) and are arranged to be engaged simultaneously by an interlocker ring 76 which is shown in Fig. III. The ring 76 is mounted to turn slidably upon the collar 53. The turning movement thereof is limited by the slots 77 and screws 78 which secure and pilot the interlocker ring 76 to the collar 53.

An integral arm 79 extends outward from the interlocker ring 76, to which arm is attached a swivel block for securing a Bowden wire, per standard practice, indicated at 80 in Fig. V. The button control of this Bowden wire may be extended to any convenient location for use by the operator for moving the latching ring 76 either into its latched or its unlatched position as desired.

The ring 76 is formed with certain cutaway portions 75a which normally permit the notched studs 71 to slide therethrough. But when the notches 75 of the studs are longitudinally in register with the interlocking latch ring 76, then the ring may be partially rotated by means of the Bowden control button (counter clockwise in Fig. III) and this will bring the solid portions of the ring 76 into the notches 75 so as thus to interlock the ring and the notched studs together in a slidable tandem assembly.

Since this ring 76 is mounted upon the collar 53, then movement of the collar 53 (under the control of the clutch pedal as above explained) will carry the interlocker ring 76 along with it in its movements along the sleeve 54 in either direction. The parts are so arranged that the interlocker ring 76 will arrive at a point to register with the notches 75 when the release collar 53 is moved to the left (Fig. I) by the action of the clutch pedal.

While the clutch pedal is in this depressed position the interlocker ring 76 may be shifted to engage the notches 75 in studs 71 through means of the Bowden wire 80. When this engagement has been effected and the clutch pedal permitted to return to its normal position the ring 76 pulls the studs 71 and the attached bearing plate 70 to the right in Figure I causing the bearing to press upon the pads 73 at the inner ends of the levers 33. In this manner the levers 33 may be actuated manually to duplicate the action effected automatically by the weights 28 and associated parts. When the levers 33 are thus actuated manually the mechanical advantage of the levers is substantially increased due to the increased ratio between the pads 73 and the pivot pins 29.

In converting the clutch from automatic to conventional form, the action of the clutch is reversed. It will be recalled that when the clutch is under its automatic operation the driven member 13 is normally out of contact with the driving member 12 and the pressure plate 16. This is due to the effect of the springs 20. When the converter mechanism has been interlocked, the driven member 13 is normally held in contact with the driving member 12 and the pressure plate 16 by reason of the pressure of bearing plate 70 upon levers 33. To disengage the clutch when the converter mechanism is interlocked it is necessary to depress the clutch pedal thereby moving bearing plate 70 to the left (Fig. I) and permitting springs 20 to pull pressure plate 16 away from the driven member 13.

To reconvert the clutch to its automatic form it is merely necessary to shift the interlocker ring 76 so that the notches 75a in the edge thereof are brought into alignment with the studs 71. This may be accomplished by a movement of the Bowden wire 80 while the clutch pedal is depressed and the collar 53 and associated parts are at the extreme left position (Fig. I). When the interlocker ring 76 has thus been shifted back to its inoperative position the bearing plate 70 is disengaged from the collar 53 and the release of the clutch pedal (movement of the collar 53 to the right) again places the pressure plate 16 under the influence of the springs 20.

During the conversion operation to conventional, it will be understood that the retracting spring for restoring the clutch pedal to normal position, must be strong enough to overcome the tension of the clutch disengaging springs 20; and to finally positively engage the clutch against slip.

*Clutch pedal and connections for converter*

The clutch pedal and connections will now be described with reference to Figs. I, III and IX.

A clutch pedal 85 of conventional design is connected to a release fork shaft 87 through suitable linkage and adjusting means. Shaft 87 is provided with two forks 88 each of which carry a roller 89 adapted to engage the bearings 55 formed in collar 53.

In Figure IX the clutch pedal 85 is shown in its normal or retracted position. When it is depressed or moved toward the left, the shaft 87 is rotated in a counter clockwise direction causing the forks 88 to press the collar 53 to the left (Fig. I). As previously described when the collar 53 is moved to the left the interlocker ring 76 is brought into registry with the notches 75 in the studs 71 and may be shifted by the wire 80 to effect an engagement between the studs and the interlocker ring.

Upon releasing the clutch pedal 85, it is restored to its retracted or normal position by retracting spring 90. The effective force of spring 90 upon shaft 87 is sufficient to move the collar 53, bearing plate 70 and levers 33 to the right (Fig. I) and overcome the force of springs 20, thereby causing a positive engagement of the clutch. When pedal 85 is depressed a counterclockwise rotation is imparted to shaft 87 through the adjustable lever arm 86. When pedal 85 is released spring 90 imparts a clockwise rotation to shaft 87 through means of the link toggles 91 and 92 and adjustable lever arm 93.

Link 91 is pivotally connected to a stationary bracket 91a at one extremity and pivotally connected to link 92 at its other extremity. Link 92 is pivotally connected to adjustable lever arm 93. One end of spring 90 is connected to links 91 and 92 at their junction point as shown in Figure IX. The other end of the spring is connected to a stationary bracket 90a. The link 91 is somewhat shorter than link 92 and the two links are so arranged that they cannot be pulled downwardly past center by spring 90.

The pedal retracting and converter engaging function is accomplished primarily through the coaction of the link toggles 91 and 92 and retracting spring 90 which together control the amount of pull that can be exerted at the clutch levers 33. By reason of the arrangement of these parts a low pedal pressure is obtained while at the same time an adequate pressure is provided for effectively engaging the clutch when the converter ring is in its interlocked position.

These advantages are made possible by reason of the unequal length of the link toggles 91 and 92 together with the angle of inclination of the links. When the pedal is depressed the inclination of the shorter link 91 is such that the increased tension of retracting spring 90 is in effect temporarily canceled, thus avoiding an excessive resistance to the movement of pedal 85. On the other hand, when the pedal 85 is released the effect of spring 90 is applied to shaft 87 through link 91, 92 and 93 and progressively increases as these approach their normal position as illustrated in Figure IX.

Résumé

From the foregoing description it will be apparent that the clutch assembly embodying the present invention may be readily converted from automatic to manual (conventional) operation and reconverted from manual to automatic operation.

During automatic operation the driving and driven members are normally held in disengaged relation by the springs 20. Levers 33 are operated upon by weights 28, under the influence of the rotary movement of the clutch, to effect engagement of the driving and driven members. Disengagement may be effected either by reducing the motor speed to such an extent that the force of springs 20 overcomes the centrifugal force of weights 28; or by depressing the foot pedal 85 and thereby pressing collar 53 against levers 33 to rotate the latter in a clockwise direction against the force of springs 37.

The clutch may be converted from automatic to manual operation by depressing the pedal 85 whereby to move release collar 53 to the left (Fig. I). At its extreme left position the interlocker ring 76 carried by collar 53 registers with notches 75 in converted bearing plate studs 71. While in this position the ring 76 may be rotated to enter notches 75 by pulling the Bowden wire 80.

The converter bearing plate 70 is then interlocked with and in effect made a part of collar 53. Upon releasing pedal 85, retracting spring 90 restores the pedal to its inoperative position and moves collar 53 and converter bearing plate 70 to the right (Fig. I) thereby rotating levers 33 in a counterclockwise direction against the force of springs 20 causing pressure plate 16 to engage the driven member 13 and press it against driving member 12. While the converter bearing plate 70 is interlocked with the collar 53, the driving and driven members are normally held in engaged position and can be disengaged only by depressing pedal 85.

The clutch may be reconverted to automatic operation by depressing pedal 85 to move converter bearing plate 70 to its extreme left position (Fig. I) and then rotating interlocker ring 76 by pushing wire 80 to bring notches 75 into alignment with studs 71. Upon releasing the foot pedal, the collar 53 is moved to the right (Fig. I) into its inoperative position by spring 90 while converter bearing plate 70 remains at its extreme left position. The spring 81 in sleeve 54 engages one of the notches 82 in stud 71 thereby properly positioning bearing plate 70 when it is detached from collar 53. Several notches 82 are formed in stud 71 in order to compensate for wear in the associated operating parts and thereby insure proper positioning of bearing plate 70 regardless of such wear.

The scope of the invention is indicated in the appended claims.

1. In a clutch, a driving member, a driven member, levers arranged to effect engagement and disengagement of said members, a release collar adapted to operate upon said levers to effect disengagement only of said members, a retracting spring yieldably holding said collar in its inoperative retracted position, converter mechanism adapted to engage said levers, and means for interlocking said converter mechanism with said collar whereby said retracting spring may be employed to effect engagement of said driving and driven members.

2. In a clutch, a driving member, a driven member, levers arranged to effect engagement and disengagement of said members, a release collar adapted to operate upon said levers to effect disengagement only of said members, converter mechanism adapted to operate upon said levers to effect engagement of said members when interlocked with said collar, and means for manually interlocking said converter with said collar.

3. In a clutch, a driving member, a driven member, levers arranged to effect engagement and disengagement of said members, a release collar adapted to operate upon said levers to effect disengagement only of said members, a retracting spring yieldably holding said collar in its inoperative position, converter mechanism actuated by said retracting spring to operate the said levers to effect engagement of said members when interlocked with the collar, and manual means for interlocking said converter with said collar.

4. Converter mechanism for an automatic clutch comprising a converter assembly slidably mounted upon a bearing sleeve, said assembly including a plurality of notched studs arranged longitudinally of said sleeve, a release collar slidably mounted upon said sleeve, an interlocker ring carried by said collar, and means for causing portions of said ring to enter the notches in the said studs whereby to effect an interlock between the converter assembly and the collar.

5. Converter mechanism for an automatic clutch comprising a converter assembly slidably mounted upon a bearing sleeve, a release collar slidably mounted upon said bearing sleeve independently of said converter assembly, a retracting spring yieldably holding said collar in its retracted position away from said converter, manually operated means for projecting said collar against the resistance of said spring to its extended position toward said converter, and means for interlocking said converter assembly with said collar only while the latter is in its extended position.

6. Mechanism of the character described in claim 5 wherein the interlocking means comprises a latching ring carried by the collar adapted to engage a recess formed in a portion of the converter assembly.

7. Mechanism of the character defined in claim 5 wherein the converter assembly includes a plurality of notched studs and wherein the collar is provided with a latching ring adapted to engage the notches in said studs.

8. Mechanism of the character defined in claim 5 wherein means is provided for yieldably holding the converter assembly in a predetermined inoperative position on said bearing sleeve.

9. Mechanism of the character defined in claim 5 wherein the interlocking means comprises a latching ring carried by the collar adapted to engage notches formed in a portion of the converter assembly and manually operated means for effecting an interlock between said latching ring and said notches.

10. In a clutch, a driving member, a driven member, release mechanism adapted to operate upon said driving member through intermediate means to effect disengagement only of said members, converter mechanism adapted to operate upon the driving member through the same intermediate means to effect engagement only of said members, said converter mechanism being operable only when interlocked with said release mechanism, and means for interlocking the converter and release mechanism.

11. In a clutch, a driving member, a driven member, release mechanism adapted to operate upon the driving member to effect disengagement only of said members, said release mechanism including a retracting spring yieldably holding the mechanism in its inoperative position, a converter assembly adapted to operate upon the driving member to effect engagement of the members only when interlocked with the release mechanism, and means for interlocking the converter assembly with the release mechanism.

12. In an automatic clutch, including driving and driven members, converter mechanism comprising a release collar for effecting engagement of the clutch slidably mounted upon a bearing sleeve, a converter assembly for effecting engagement of the clutch when interlocked with the collar also slidably mounted upon said sleeve independently of said collar, and means for interlocking said converter assembly with said collar.

13. In a clutch, a driving member, a driven member, levers arranged to effect engagement and disengagement of said members, a release collar adapted to operate upon said levers to effect disengagement only of said members, and means detachably connected to the collar adapted to operate upon said levers to effect engagement only of said members.

ELMER V. J. TOWER.